(12) United States Patent
Sakai et al.

(10) Patent No.: US 7,051,702 B2
(45) Date of Patent: May 30, 2006

(54) INTAKE APPARATUS FOR INTERNAL COMBUSTION ENGINE

(75) Inventors: Taro Sakai, Kawasaki (JP); Youko Kawaguchi, Yokohama (JP); Hidenori Imamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 70 days.

(21) Appl. No.: 10/816,001

(22) Filed: Apr. 2, 2004

(65) Prior Publication Data

US 2004/0226536 A1 Nov. 18, 2004

(30) Foreign Application Priority Data

| Apr. 3, 2003 | (JP) | ............................... 200-100199 |
| Apr. 3, 2003 | (JP) | ............................. 2003-100196 |
| Apr. 3, 2003 | (JP) | ............................. 2003-100200 |

(51) Int. Cl.
F02B 31/06 (2006.01)
F02B 31/08 (2006.01)

(52) U.S. Cl. .................. 123/308; 123/432; 123/188.14

(58) Field of Classification Search ................ 123/308, 123/432, 188.14
See application file for complete search history.

(56) References Cited

U.S. PATENT DOCUMENTS

| 4,308,830 | A |   | 1/1982  | Yamada et al. |           |
| 5,267,543 | A | * | 12/1993 | Novak et al.  | 123/188.14 |
| 5,878,712 | A | * | 3/1999  | Wolters et al.| 123/308   |
| 6,065,459 | A | * | 5/2000  | Stevens       | 123/590   |
| 6,199,534 | B1|   | 3/2001  | Tokuyasu et al.|          |
| 6,484,690 | B1| * | 11/2002 | Tokuyasu et al.| 123/301  |
| 6,499,456 | B1|   | 12/2002 | Nogi et al.   |           |
| 6,575,133 | B1| * | 6/2003  | Ries-Mueller et al. | 123/308 |
| 6,854,448 | B1| * | 2/2005  | Okamoto et al.| 123/470   |
| 6,874,465 | B1| * | 4/2005  | Arimatsu et al.| 123/432  |

FOREIGN PATENT DOCUMENTS

| DE | 10134114 A1 | 10/2002 |
| DE | 10128500 C1 | 2/2003  |
| GB | 2313625 A   | 3/1997  |
| JP | 3-246320 A  | 11/1991 |
| JP | 6-159079 A  | 6/1994  |

(Continued)

OTHER PUBLICATIONS

U.S. Appl. No. 10/676,077, filed Oct. 2, 2003, Sakai et al.

(Continued)

*Primary Examiner*—Erick Solis
(74) *Attorney, Agent, or Firm*—Foley & Lardner LLP

(57) ABSTRACT

An intake apparatus for an internal combustion engine, including a partition extending in a longitudinal direction of an intake port so as to divide an inside region of the intake port into a first passage and a second passage, and a gas motion control valve disposed at a downstream end of an intake manifold and adjacent to an upstream end of the partition. The gas motion control valve includes a rotatable valve element and has a full-closed position where the valve element fully closes the second passage of the intake port and a full-open position where the valve element fully opens the second passage of the intake port. The valve element and the partition cooperate with each other to define an interspace between the valve element and the upstream end of the partition when the gas motion control valve is in the full-closed position.

20 Claims, 16 Drawing Sheets

FOREIGN PATENT DOCUMENTS

| | | |
|---|---|---|
| JP | 6-159203 A | 6/1994 |
| JP | 6-264816 A | 9/1994 |
| JP | 2514563 Y2 | 8/1996 |
| JP | 2000-204954 A | 7/2000 |
| JP | 2001-193469 A | 7/2001 |
| JP | 2001-248484 A | 9/2001 |
| JP | 2002-54535 A | 2/2002 |
| JP | 2002-227651 A | 8/2002 |

OTHER PUBLICATIONS

U.S. Appl. No. 10/676,015, filed Oct. 2, 2003, Arimatsu et al.
U.S. Appl. No. 10/815,972, filed Apr. 2, 2004, Nishi et al.
U.S. Appl. No. 10/815,974, filed Apr. 2, 2004, Sakai.
U.S. Appl. No. 10/815,969, filed Apr. 2, 2004, Tominaga et al.

* cited by examiner

US 7,051,702 B2

INTAKE APPARATUS FOR INTERNAL COMBUSTION ENGINE

BACKGROUND OF THE INVENTION

The present invention relates to intake apparatus for an internal combustion engine, and more specifically to an intake apparatus including an intake port for increasing incylinder gas motion such as tumble or swirl.

Gas motion in engine cylinder such as tumble or swirl is important to achieve stable combustion of diluted air/fuel mixture in a spark ignition internal combustion engine. Accordingly, engines of some types require an intake apparatus which can increase incylinder gas motion in wider engine operation region.

Japanese Patent Application First Publication No. 2002-54535 shows a gas motion control valve to increase incylinder gas flow by closing a half of the section of an intake port. Japanese Patent Application First Publication No. H06-159079 shows an intake apparatus including a partition dividing an intake port into upper and lower halves, and a gas motion control valve closing the lower half of the intake port, to increase a tumble ratio.

SUMMARY OF THE INVENTION

Such a gas motion control valve is arranged to produce an incylinder tumbling flow by decreasing an open area to an entire flow passage area of an intake port. However, as the open area ratio becomes smaller, the flow resistance increases, and the quantity of intake air that a cylinder can take in becomes smaller. Therefore, an engine operating region in which an incylinder flow is increased by a gas motion control valve is limited to a relatively narrow range.

It is an object of the present invention to provide an intake apparatus for increasing incylinder gas motion without decreasing the open area ratio of an intake port excessively.

In one aspect of the present invention, there is provided an intake apparatus for an internal combustion engine, the internal combustion engine including a cylinder head that defines a plurality of engine cylinders and an intake port connected to each of the engine cylinders, and an intake manifold connected with the intake port, the intake apparatus comprising:

a partition extending in a longitudinal direction of the intake port so as to divide an inside region of the intake port into a first passage and a second passage; and a gas motion control valve disposed at a downstream end of the intake manifold and adjacent to an upstream end of the partition, the gas motion control valve including a rotatable valve element and having a full-closed position where the valve element fully closes the second passage of the intake port and a full-open position where the valve element fully opens the second passage of the intake port, the valve element and the partition cooperating with each other to define an interspace between the valve element and the upstream end of the partition when the gas motion control valve is in the full-closed position.

In a further aspect of the present invention, there is provided an intake apparatus for an internal combustion engine, the internal combustion engine including a plurality of engine cylinders, the intake apparatus comprising:

an engine block defining an intake port adapted to be connected to each of the engine cylinders;

split means for dividing an inside region of the intake port into a first passage and a second passage which extend in a longitudinal direction of the intake port; and valve means for controlling intake air flowing into the second passage of the intake port, the valve means cooperating with the split means to recirculate a part of intake air flowing toward the engine cylinder through the first passage of the intake port, to an upstream end of the first passage of the intake port through the second passage of the intake port when the valve means prevents the intake air flowing into the second passage of the intake port.

DETAILED DESCRIPTION OF THE INVENTION

Figure 1:
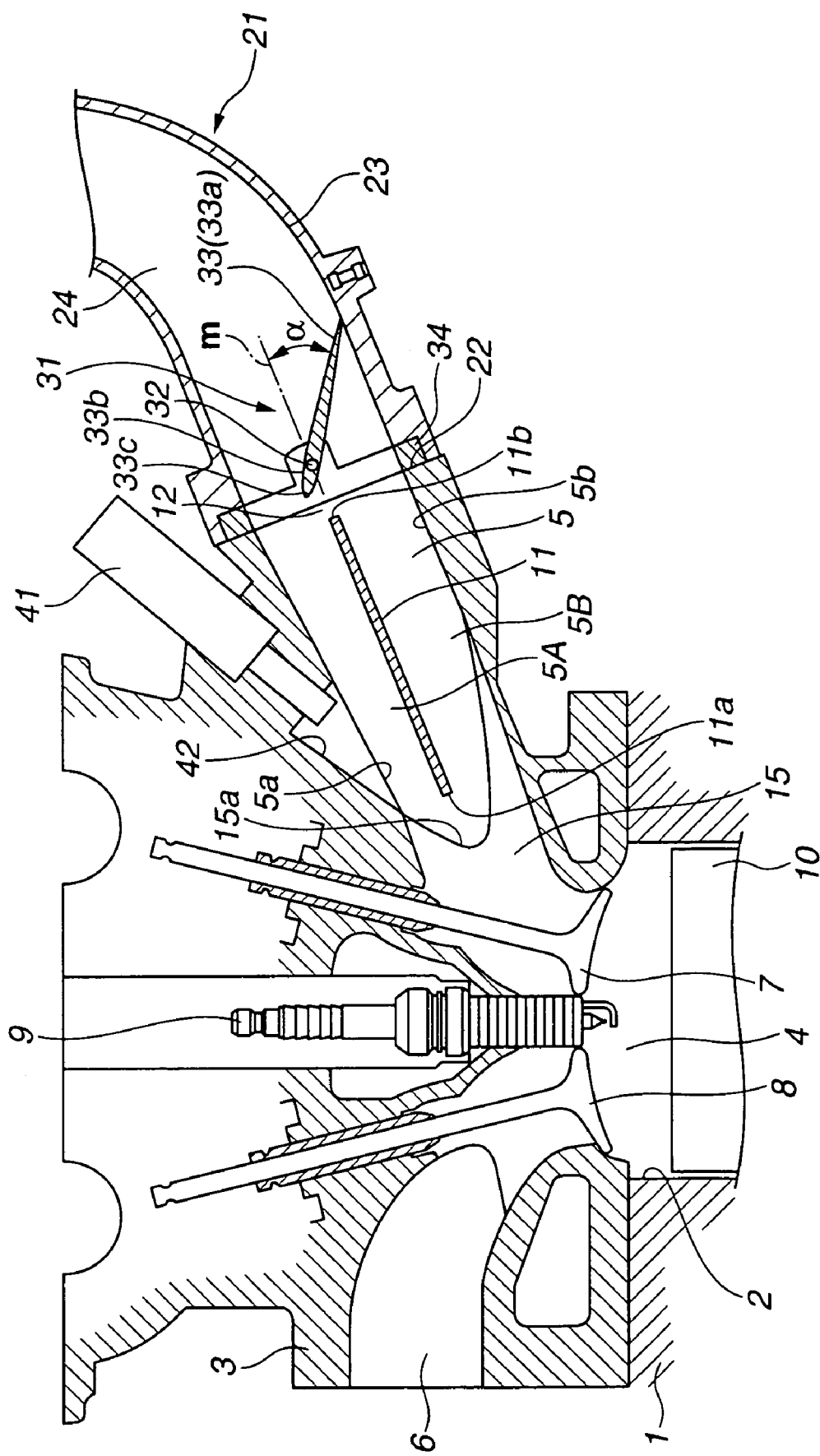
FIG. 1 is a sectional view showing an engine with an intake apparatus according to a first embodiment of the present invention.
Figure 2:
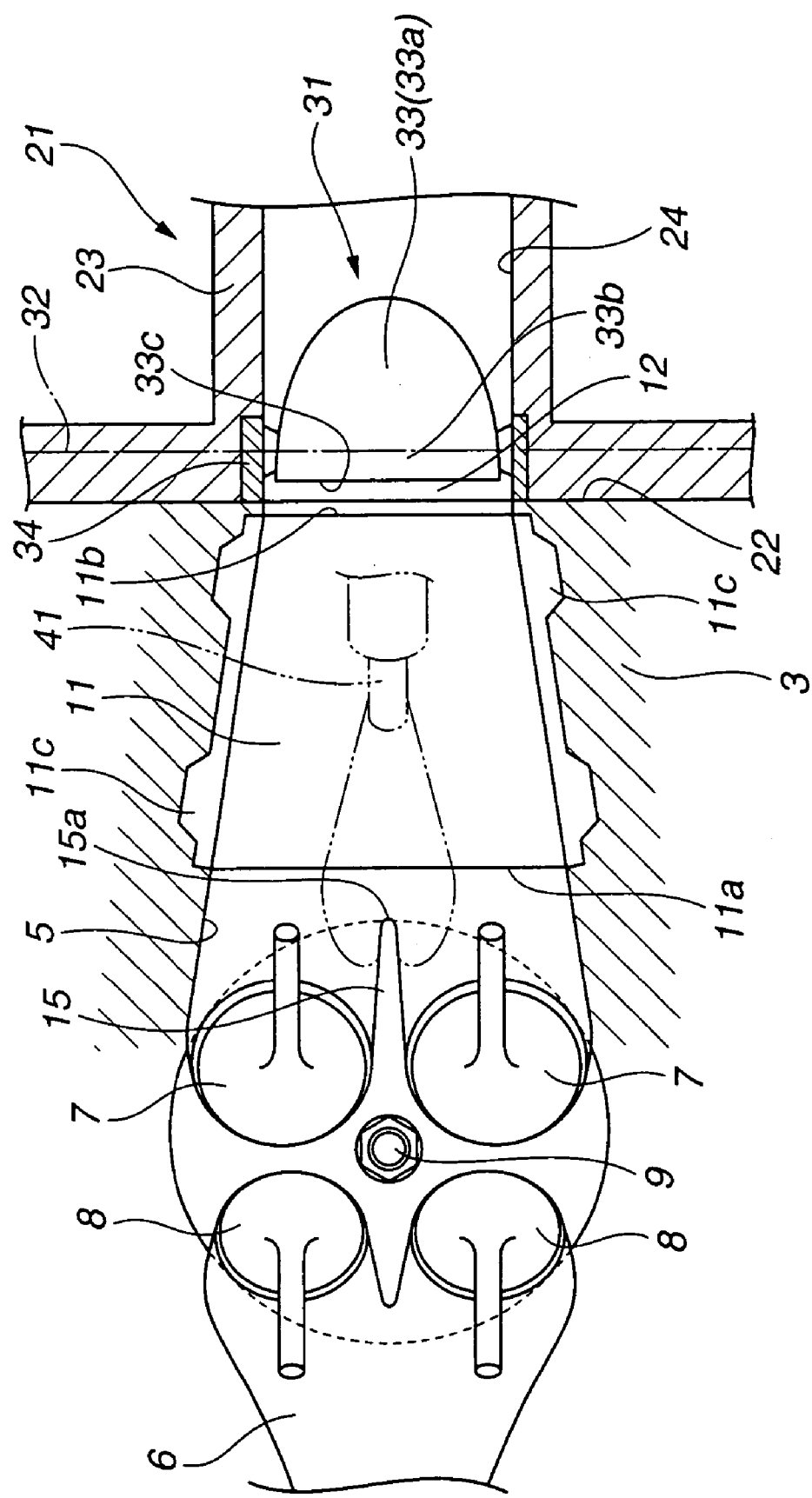
FIG. 2 is a plan view of the intake apparatus of FIG. 1 as viewed from above.

Referring to FIGS. 1 and 2, an intake apparatus according to a first embodiment of the present invention now is explained. In this embodiment, the intake apparatus is applied to a port-injection spark ignition internal combustion engine and designed to strengthen an incylinder gas motion, specifically, tumble. However, this apparatus may be applied to other types of engine, such as a direct-injection spark ignition internal combustion engine. As illustrated in FIG. 1, the engine has an engine block including cylinder block 1 and cylinder head 3 covering a top portion of cylinder block 1. Cylinder block 1 is formed with a plurality of engine cylinders 2. Cylinder head 3 is formed with a plurality of recesses each defining pentroof-shaped combustion chamber 4 that has two sloping surfaces. Intake port 5 is connected to each of engine cylinders 2, and has a downstream end opening in one of the two sloping surfaces of combustion chamber 4. Exhaust port 6 has an end opening in the other of the two sloping surfaces of combustion chamber 4. Intake valve 7 is arranged to open and close the downstream end of intake port 5. Exhaust valve 8 is arranged to open and close the end of exhaust port 6. In this embodiment, a downstream end portion of intake port 5 is bifurcated, and has two branches each opening into combustion chamber 4. Accordingly, each engine cylinder 2 has two intake valves 7 for opening and closing the downstream ends of the two branches of intake port 5. Similarly, each engine cylinder 2 has two exhaust valves 8. Spark plug 9 is provided at a central portion of combustion chamber 4 which is surrounded by these four valves 7 and 8. Piston 10 is received in engine cylinder 2. Piston 10 has a flat crown as shown in FIG. 1. However, the piston crown may be designed to have various shapes according to various requirements, such as requirement for stratified charge combustion.

Intake port 5 has an elongated inside region therein. Partition 11 extends in a longitudinal direction of intake port 5 so as to divide the elongated inside region of intake port 5 into an upper region and a lower region as shown in FIG. 1. The upper region acts as first passage 5A, and the lower region acts as second passage 5B. The term "upper" means "higher" in position in an axial direction of engine cylinder 2 which extends from the position of an engine crankshaft toward combustion chamber 4. In this embodiment, cylinder head 3 is made of aluminum alloy, and partition 11 is in the form of a metal plate, for instance, a steel plate, as an insert inserted into cylinder head 3 upon casting cylinder head 3, to thereby be formed as an integral part of cast cylinder head 3.

Downstream end 11a of partition 11 is located on a most-downstream side, namely, near intake valve 7. Specifically, downstream end 11a of partition 11 is located immediately upstream of branch point 15a of the two branches of intake port 5. Namely, downstream end 11a of partition 11 is positioned immediately upstream of an upstream end of intermediate wall 15 that is disposed between the two branches of intake port 5 and separates the downstream end portion of intake port 5 into the two branches. In this embodiment, a portion of intake port 5 receiving partition 11 extends substantially straight in the longitudinal direction of intake port 5, and partition 11 extends along the portion of intake port 5. Namely, partition 11 is in the form of a flat plate extending substantially straight in the longitudinal direction of intake port 5. However, intake port 5 may be curved, and partition 11 may be curved along the curved section of intake port 5. Upstream end 11b of partition 11 is located slightly downstream of intake manifold mount surface 22 of cylinder head 3 onto which intake manifold 21 is mounted.

As illustrated in FIG. 2, upstream end 11b and downstream end 11a of partition 11 are parallel to intake manifold mount surface 22 of cylinder head 3. The metal plate forming partition 11 has a generally trapezoidal shape in plan view. However, this shape depends on a geometry of intake port 5. Further, partition 11 has two pairs of projections 11c on side peripheries thereof that cooperate with upstream end 11b and downstream end 11a to form the trapezoidal shape. Projections 11c are provided for enhancing the connection of partition 11 with cylinder head 3 by casting.

Thus, partition 11 splits the inside region of intake port 5 excluding the two branches and interspace 12 between partition 11 and valve element 33 as explained later, into first upper passage 5A defined by partition 11 and upper inside wall surface 5a of intake port 5, and second lower passage 5B defined by partition 11 and lower inside wall surface 5b thereof.

Intake port 5 is connected with branch portion 23 of intake manifold 21 which is provided corresponding to each engine cylinder 2. First and second passages 5A and 5B of intake port 5 are communicated with branch passage 24 of branch portion 23. Thus, there is provided an intake path extending from a collector portion, not shown, of intake manifold 21 to each engine cylinder 2. Branch passage 24 has a downstream portion located near intake port 5 which extends straight in the longitudinal direction of intake port 5, and an upstream portion upstream of the downstream portion which is upwardly curved toward the collector portion.

Gas motion control valve 31 is arranged to control a flow of intake air flowing into second passage 5B of intake port 5. Gas motion control valve 31 has a full-closed position where the intake air flowing from the upstream side of gas motion control valve 31 is prevented from flowing into second passage 5B of intake port 5, and a full-open position where the intake air flowing from the upstream side of gas motion control valve 31 is allowed to flow into second passage 5B of intake port 5. Specifically, gas motion control valve 31 is disposed in the downstream portion of branch passage 24 of branch portion 23 of intake manifold 21 and adjacent to upstream end 11b of partition 11. Gas motion control valve 31 includes rotatable valve shaft 32 and plate-shaped valve element 33 fixedly supported on valve shaft 32. Valve shaft 32 extends in a direction of a row of the engine cylinders and is rotatable about its axis. Valve shaft 32 is located on the downstream portion of branch passage 24 of branch portion 23 and positioned on imaginary reference plane m extending straight from partition 11 toward the upstream side of partition 11 as shown in FIG. 1. The axis of valve shaft 32 lies in reference plane m. Valve element 33 includes main portion 33a extending from valve shaft 32 in one direction, and extension portion 33b extending from valve shaft 32 in an opposite direction and having a length smaller than a length of main portion 33a. Main portion 33a opens and closes the upstream end of second passage 5B of intake port 5. Main portion 33a has a profile substantially matched with a lower inside wall surface of the downstream portion of branch passage 24. In this embodiment, main portion 33a has a generally semi-elliptic profile as illustrated in FIG. 2. In contrast, as shown in FIG. 2, extension portion 33b is formed into an elongated rectangular shape having a distal end, namely, downstream end 33c of valve element 33, which extends straight and parallel to intake manifold mount surface 22 and upstream end 11b of partition 11. Valve shaft 32 is spaced from upstream end 11b of partition 11 such that extension portion 33b of valve element 33 is prevented from interfering with upstream end 11b of partition 11. In this embodiment, downstream end 33c of valve element 33 is positioned slightly upstream of intake manifold mount surface 22 of cylinder head 3. Namely, downstream end 33c of valve element 33 is located slightly upstream of an end surface of a downstream end flange of branch portion 23 which abuts on intake manifold mount surface 22 of cylinder head 3.

Valve shaft 32 is connected with an actuator, not shown. Gas motion control valve 31 is controlled to be in the full-closed position shown in FIG. 1 in an engine operating situation to strengthen tumble. In the full-closed position, valve element 33 fully closes the upstream end of second passage 5B of intake port 5. Valve element 33 is placed in an inclined state in which main portion 33a is located upstream of valve shaft 32 and the intake air flowing from the upstream side of gas motion control valve 31 is guided to first passage 5A of intake port 5 along an upper surface of valve element 33. In other words, main portion 33a of valve element 33 is designed in profile to completely close a lower region positioned lower than valve shaft 32 when valve element 33 is in the inclined state. It is preferable to define inclination α of valve element 33 in a range of 30–40 degrees in order to reduce fluctuation in tumble intensity as explained later. Here, inclination α is defined as an angle formed by valve element 33 and reference plane m extending from partition 11. Further, in the full-closed position of gas motion control valve 31, extension portion 33b of valve element 33 projects toward the upper region above partition wall 11, namely, first passage 5A, in intake port 5. Further, valve element 33 and partition 11 cooperate with each other to define interspace 12 between downstream end 33c of valve element 33 and upstream end 11b of partition 11. Interspace 12 acts as a communication passage through which the upstream end of first passage 5A and the upstream end of second passage 5B are communicated with each other. In this embodiment, as illustrated in FIG. 2, upstream end 11b of partition 11 and downstream end 33c of valve element 33 have straight peripheral edges parallel to each other, between which interspace 12 having a uniform length is produced.

In an engine operating region such as a high speed high load region where the intake air quantity becomes greater, gas motion control valve 31 is in the full-open position where valve element 33 fully opens the upstream end of second passage 5B of intake port 5. In the full-open position of gas motion control valve 31, valve element 33 is aligned in plane with partition 11 and parallel to the intake air stream oriented toward intake port 5. Extension portion 33b of valve element 33 is aligned in plane with partition 11 to thereby minimize interspace 12. Downstream end 33c located on extension portion 33b is positioned adjacent to upstream end 11b of partition 11.

In this embodiment, gas motion control valve 31 includes valve frame 34 having an annular shape. Valve element 33 is rotatably supported inside valve frame 34. Valve element 33 and valve frame 34 constitute one unit. Valve element 33 is arranged within the downstream portion of branch passage 24 of branch portion 23 by mounting the one unit to an inner periphery of the downstream end flange of branch portion 23 of intake manifold 21. Branch portion 23 has a recessed portion in the inner periphery of the downstream end flange, to which valve frame 34 with valve element 33 is fitted. Valve shaft 32 is inserted into valve element 33 such as to cross respective branch portions 23, and is connected with respective valve elements 33. Intake manifold 21 having thus-constructed gas motion control valve 31 is mounted to cylinder head 3 so that gas motion control valve 31 is fixedly held in place.

Fuel injector 41 for injecting fuel toward intake port 5 is arranged upward of intake port 5 of cylinder head 3. Fuel injector 41 is designed to provide a generally V-shaped split spray of fuel corresponding to the pair of intake valves 7. As illustrated in FIG. 1, fuel injector 41 is located near intake valve 7 in order to prevent the fuel spray oriented toward valve heads of intake valves 7 from interfering with partition 11. Recessed portion 42 is formed in upper inside wall surface 5a of intake port 5. The fuel sprayed from fuel injector 41 passes through recessed portion 42 and the downstream end portion of intake port 5, and is directed toward the valve heads of intake valves 7.

The internal combustion engine has a known exhaust gas recirculation apparatus, not shown, for instance, an exhaust gas recirculation control valve, for recirculating a part of exhaust gas emitted from an exhaust system to an intake system. The exhaust gas recirculation apparatus is constructed to realize stable combustion at high exhaust gas recirculation rate by utilizing tumble in engine cylinder 2 and therefore improve fuel economy in a part load engine operating region. The exhaust gas recirculated may be introduced to the collector portion of intake manifold 21 or may be distributed to branch passage 24 for each engine cylinder 2.

Figure 3:
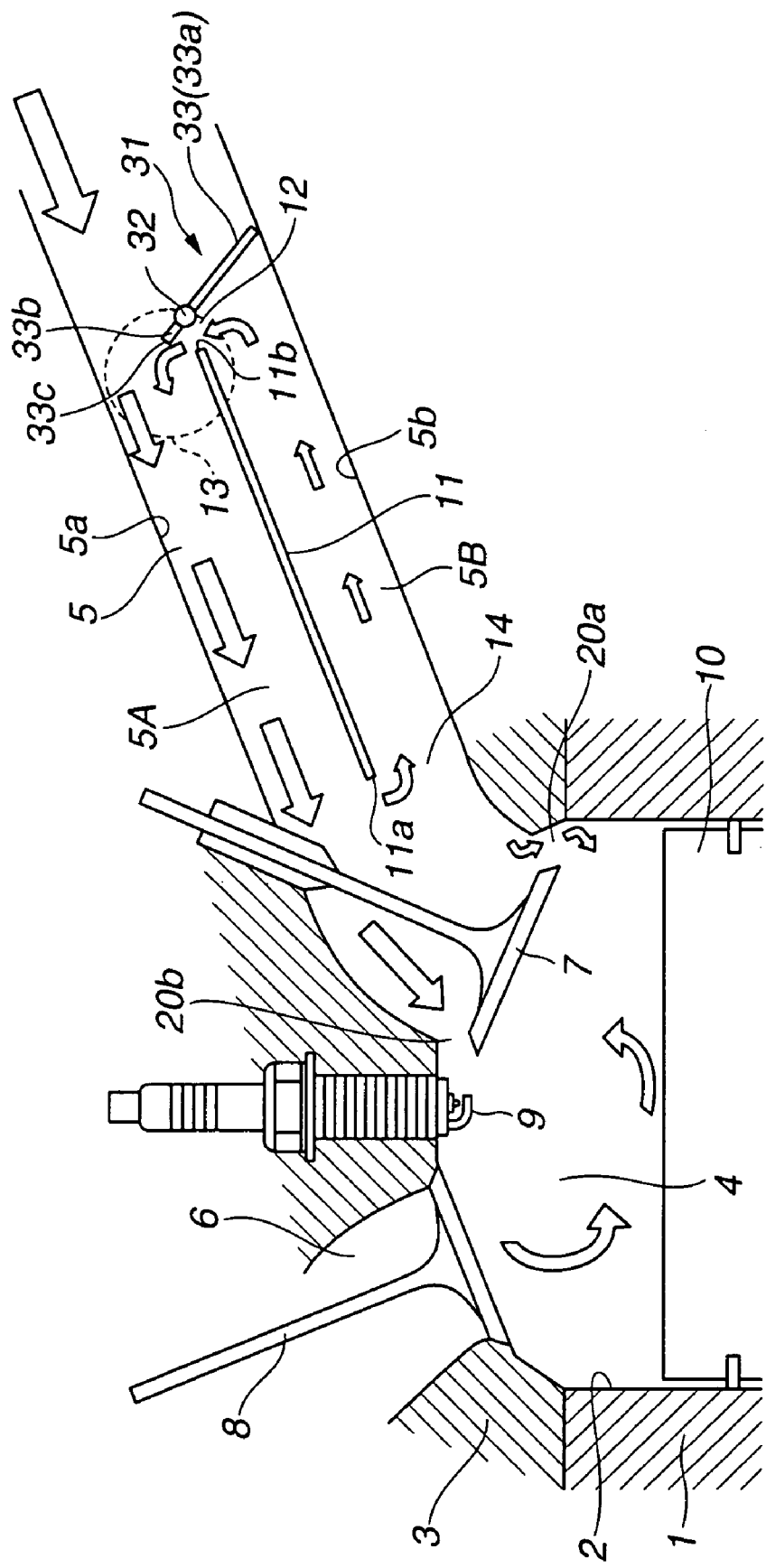
FIG. 3 is an explanatory diagram schematically illustrating a construction of the intake apparatus of FIG. 1.

Referring to FIG. 3, an operation of the intake apparatus of the first embodiment is explained. On intake stroke, intake valve 7 is opened and piston 10 descends in the downward direction in engine cylinder 2. Intake air flows into engine cylinder 2 through an open aperture around intake valve 7. In this condition, when gas motion control valve 31 is in the full-open position where both of first passage 5A and second passage 5B are opened, the intake air flows toward engine cylinder 2 through first passage 5A and second passage 5B. The intake air then substantially uniformly flows into engine cylinder 2 through the open aperture around intake valve 7. As a result, the gas motion produced in engine cylinder 2 is relatively weak.

On the other hand, when gas motion control valve 31 is in the closed position shown in FIG. 3, where second passage 5B is closed by gas motion control valve 31, the intake air flows toward engine cylinder 2 only through first passage 5A. As illustrated in FIG. 3, the intake air stream flowing along upper inside wall surface 5a of intake port 5 is large, while the intake air stream flowing along lower inside wall surface 5b of intake port 5 is remarkably small. Consequently, the intake flow rate is small and the intake flow velocity is low in lower portion 20a of the open aperture formed between intake valve 7 and the outer circumference of engine cylinder 2. In upper portion 20b of the open aperture formed between intake valve 7 and spark plug 9, the intake flow rate is great and the intake flow velocity is high. As a result, in engine cylinder 2, there is formed a strong tumbling fluid motion as shown by arrows in FIG. 3, so-called forward tumble, flowing from the intake side of intake valves 7 to the exhaust side of exhaust valves 8, and toward the crown of piston 10. Further, when gas motion control valve 31 is in the closed position, the intake air stream is throttled to flow only through first passage 5A. This causes local pressure reduction in the vicinity of upstream end 11b of partition 11 to thereby produce low pressure region 13 as shown in FIG. 3. Interspace 12 acting as the communication passage between first passage 5A and second passage 5B is located in low pressure region 13. There is formed a pressure difference between interspace 12 and downstream end 14 of second passage 5B. Because of the pressure difference, downstream end 14 of second passage 5B serves as a suction inlet through which a part of the intake air in first passage 5A is sucked into second passage 5B. The part of the intake air then flows through second passage 5B toward the upstream side of intake port 5, and enters from interspace 12 into first passage 5A and then merged into the intake air in first passage 5A. In other words, a part of the intake air passing through first passage 5A and flowing to the downstream side of intake port 5 is recirculated through second passage 5B and interspace 12, to first passage 5A. For this reason, the intake air stream flowing through upper portion 20b of the open aperture around intake valve 7 becomes larger, while the intake air stream flowing through lower portion 20a of the open aperture becomes smaller. This produces more strengthened tumble in engine cylinder 2. The intake air stream passing through lower portion 20a of the open aperture acts on the tumbling fluid motion in engine cylinder 2 so as to suppress the tumbling fluid motion. However, in this embodiment, the intake air stream passing through upper portion 20b of the open aperture can be increased, and at the same, the intake air stream passing through lower portion 20a of the open aperture can be reduced. This serves for effectively producing a strong tumble in engine cylinder 2.

The strong tumble produced in engine cylinder 2 is significantly useful for improving fuel economy by recirculating a large quantity of exhaust gas. In a part load engine operating region, the strong tumble can be produced by closing gas motion control valve 31 to thereby attain a stable combustion. In addition, a large quantity of exhaust gas can be recirculated to thereby increase the exhaust gas recirculation rate. This can attain a stable combustion, and therefore, can improve fuel economy.

Specifically, in the closed position shown in FIG. 3, extension portion 33b of valve element 33 of gas motion control valve 31 projects toward first passage 5A located upper than partition 11. Thus projecting extension portion 33b helps to effectively produce lower pressure region 13, so that the intake recirculation is ensured through interspace 12 between valve element 33 and partition 11.

When gas motion control valve 31 is in the full-open position in high speed high load engine operating region, valve element 33 is aligned in plane with partition 11. Owing to the alignment, flow resistance of the intake air streams flowing through first passage 5A and second passage 5B can be reduced. Further, in the full-open position, extension portion 33b of valve element 33 is located within interspace 12 between valve element 33 and partition 11 to thereby reduce interspace 12 and restrain disturbance in the intake air streams. Further, in this embodiment shown in FIG. 1, main portion 33a and extension portion 33b of valve element 33 gradually decrease in thickness toward tip ends thereof, each having a tapered section. Accordingly, the intake air streams can smoothly flow, and therefore, the flow resistance can be further reduced.

Figure 4:
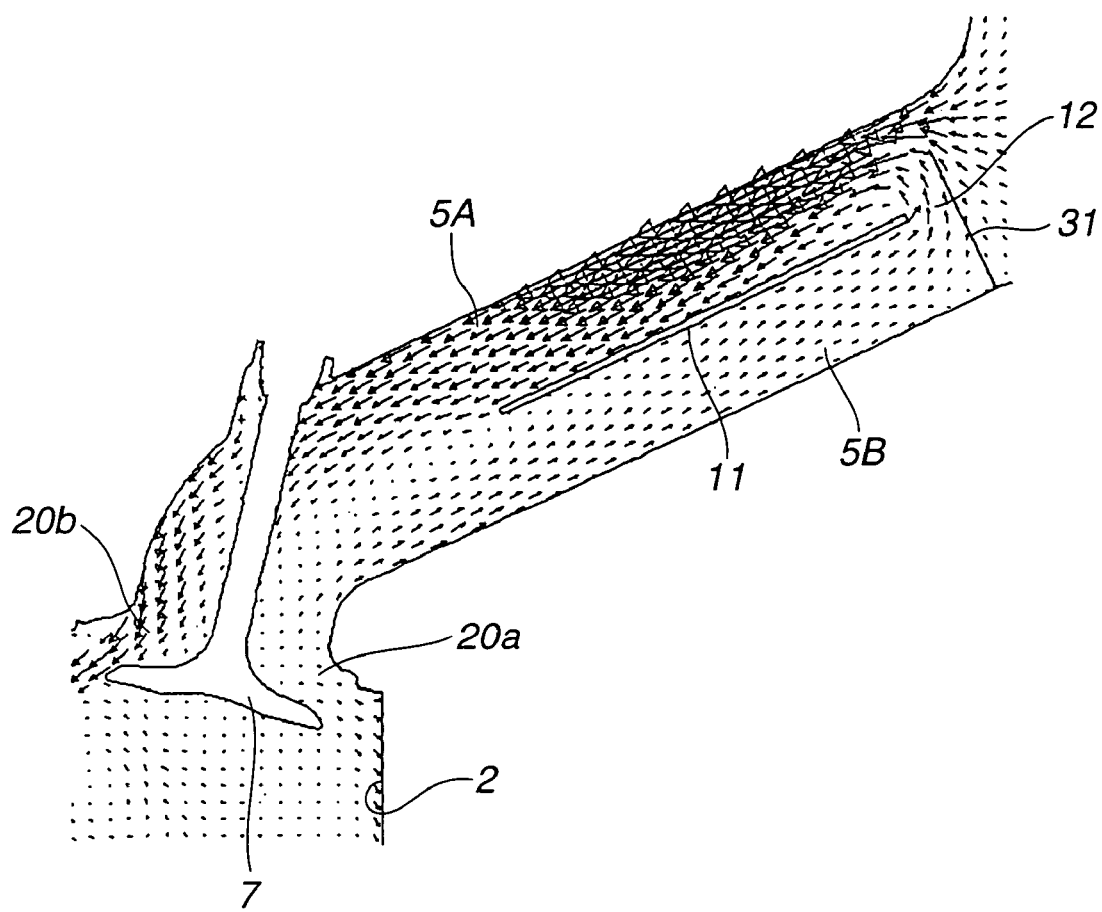
FIG. 4 is an explanatory diagram illustrating intake air streams in an intake port in the intake apparatus of FIG. 1.
Figure 5:
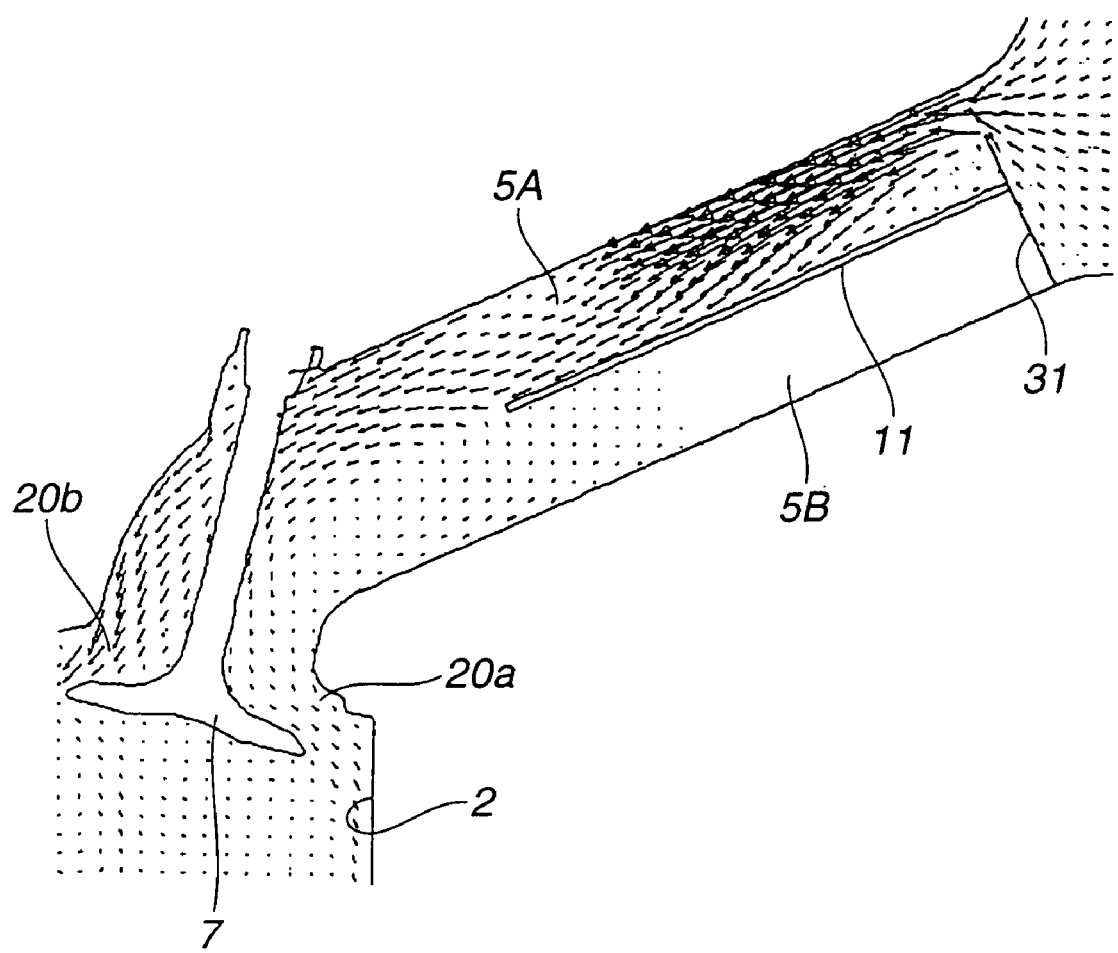
FIG. 5 is an explanatory diagram similar to FIG. 4, but showing intake air streams in an intake port in an intake apparatus of a comparative example.

FIG. 4 shows the results of analysis of actual intake air flow in the intake apparatus of the first embodiment. In FIG. 4, the speed and direction of fluid flow in each of points are shown as a vector by a small arrow. The density of arrows indicates the flow rate. The flow rate is high in a region in which arrows are dense, and low in a region in which arrows are coarse. FIG. 5 shows intake air flow in a comparative example in which interspace 12 acting as the communication passage between first and second passages 5A and 5B is eliminated. The arrangement of FIG. 5 corresponds to an intake apparatus of earlier technology in which the intake air flow is deflected to one side merely by partition 11 and gas motion control valve 31. In both cases of FIGS. 4 and 5, the opening degree of gas motion control valve 31 is held at the same value (about 20%).

The followings are evident from comparison between FIGS. 4 and 5. In the example of FIG. 5, a considerable amount of intake air passing though first passage 5A diffuses downward on the downstream side of downstream end 11a of partition 11, and flows into engine cylinder 2 through lower portion 20a of the open aperture around intake valve 7. In second passage 5B below partition 11, the intake air is almost motionless and stagnant. In contrast, in the case of FIG. 4, intake air is recirculated from a lower region near intake valve 7 to first passage 5A through second passage 5B. Therefore, the intake air flow passing through lower portion 20a of the open aperture around intake valve 7 is significantly reduced, and the intake air flow passing through upper portion 20a of the open aperture around intake valve 7 is increased. Thus, the arrangement of FIG. 4 can effectively enhance the incylinder tumble.

Figure 6:
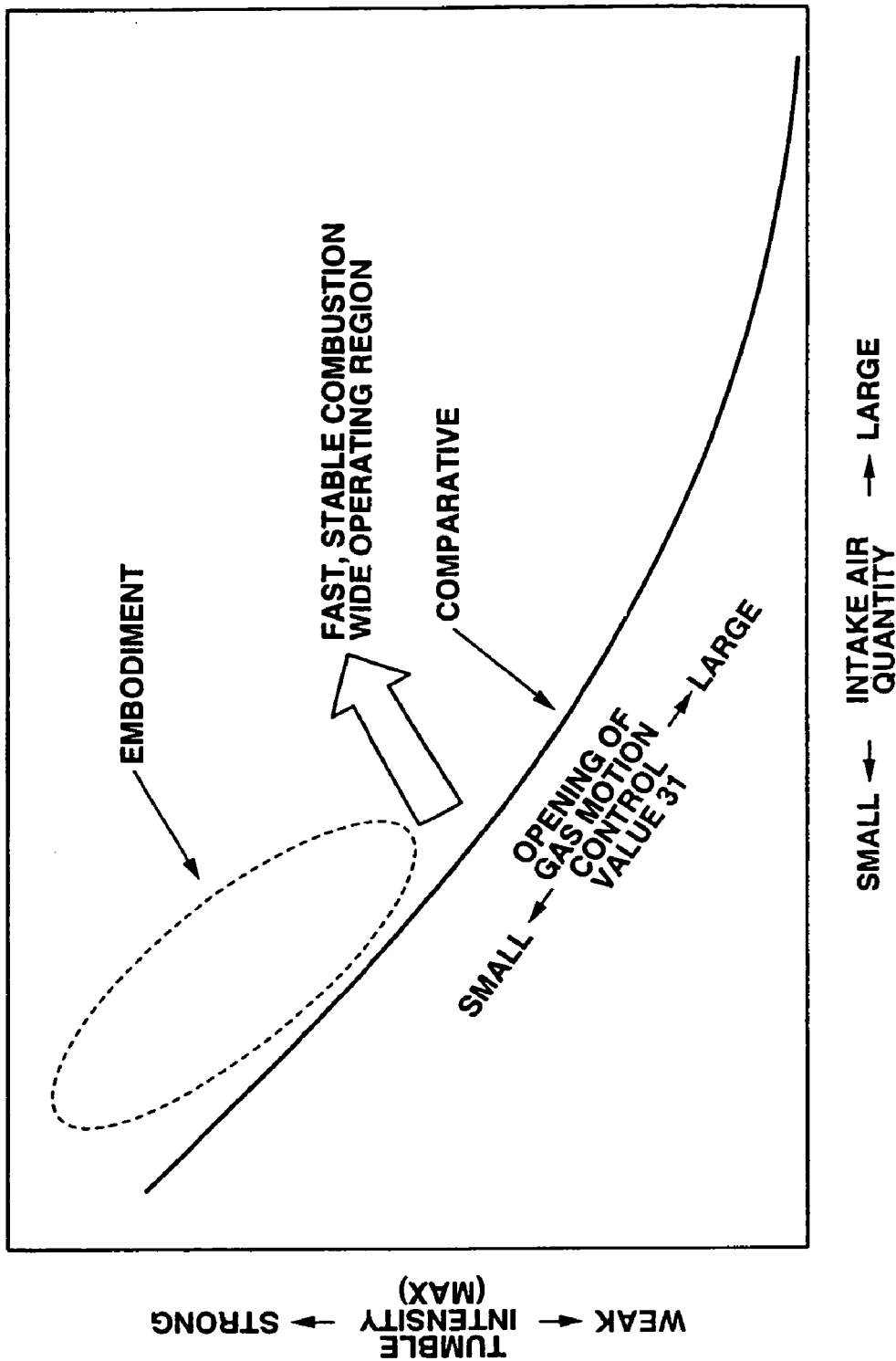
FIG. 6 is a graph showing a relationship between tumble intensity and intake air quantity, to illustrate effect of the first embodiment.

FIG. 6 shows a relationship between the tumble intensity and the intake air quantity in an intake apparatus employing partition 11 and gas motion control valve 31 as in the cases of FIGS. 4 and 5. In FIG. 6, the tumble intensity is expressed as a maximum value of the tumble ratio during intake stroke. In general, the combustion tends to be slow and unstable when the tumble is weak, and the combustion tends to be fast and stable when the tumble is strong. A characteristic of the comparative example of FIG. 5 is shown by a solid line curve in FIG. 6. In the case of this characteristic, the tumble and the intake air quantity are related to each other in the following manner. As the open area ratio or opening degree of gas motion control valve 31 is set to a smaller value, the tumble becomes strong but the intake air quantity becomes smaller. On the other hand, as the open area ratio or opening degree is set to a larger value, the intake air quantity is increased but the tumble becomes weak. A decrease of the intake air quantity means a reduction in the area of a tumble operating region in which tumble can be produced, that is, an operating region in which gas motion control valve 31 can be in the closed position. Inversely, an increase of the intake air quantity means an increase in the area of the tumble operating region. A characteristic of the embodiment of FIG. 4 is shown in an area circled by a broken line in FIG. 6. In this case, the tumble and the intake air quantity are related to each other in the following manner. When the tumble intensity is held constant, the intake air quantity can be increased. When the intake air quantity (the open area ratio or opening degree) is held constant, the tumble intensity can be increased.

Accordingly, the combination of large exhaust gas quantity recirculation and strong tumbling can be achieved in a wide engine operating region, serving for significantly enhancing fuel economy in the engine as a whole. Further, as compared with the intake apparatus of the comparative example, a stronger tumble can be produced in this embodiment in the same engine operating region. This can perform recirculation of a larger quantity of exhaust gas, so that the fuel economy can be further improved.

As described above, in this embodiment, the incylinder fluid motion can be effectively improved by recirculating a part of intake air from upper fluid passage 5A of intake port 5 to lower fluid passage 5B closed by gas motion control valve 31. Further, in this embodiment, a strengthened incylinder fluid motion can be provided without excessively decreasing the open area ratio of intake port 5. Accordingly, increase in pumping loss which is caused due to increase in flow resistance in intake port 5 can be suppressed. Further, the intake air quantity flowing into engine cylinder 2 can be increased, so that the incylinder fluid motion can be enhanced in a wide engine operating region. Furthermore, strengthened tumble can be effectively achieved by arranging partition 11 and gas motion control valve 31 so as to generate suitable interspace 12 therebetween.

Further, in this embodiment, partition 11 is formed from a metal plate as an insert inserted into cylinder head 3 upon casting to thereby form an integral part of cast cylinder head 3. Gas motion control valve 31 is arranged within the downstream portion of branch portion 23 of intake manifold 21. With this arrangement of partition 11 and gas motion control valve 31, the intake apparatus can be structurally simplified, and deterioration of the assembling operation can be avoided. Specifically, since gas motion control valve 31 and valve frame 34 constitute one unit, the operation of mounting the unit to the downstream end portion of branch portion 23 can be performed with increased efficiency. Further, the respective positions of upstream end 11b of partition 11 and downstream end 33c of valve element 33 of gas motion control valve 31 can be checked and adjusted before mounting intake manifold 21 to cylinder head 3. Accordingly, the accuracy in dimension of interspace 12 between upstream end 11b of partition 11 and downstream end 33c of valve element 33 can be readily attained. This serves for avoiding fluctuation of the tumble intensity which is caused due to change in dimension of interspace 12.

Further, upstream end 11b of partition 11 is positioned downstream of intake manifold mount surface 22 of cylinder head 3, whereby partition 11 can be prevented from contact with tools upon machining intake manifold mount surface 22 and the machining operation can be readily conducted. In addition, since valve element 33 of gas motion control valve 31 is positioned upstream of the end surface of the downstream end flange of branch portion 23 of intake manifold 21, valve element 33 can be prevented from abutting against intake manifold mount surface 22 and thereby being damaged.

Figure 7:
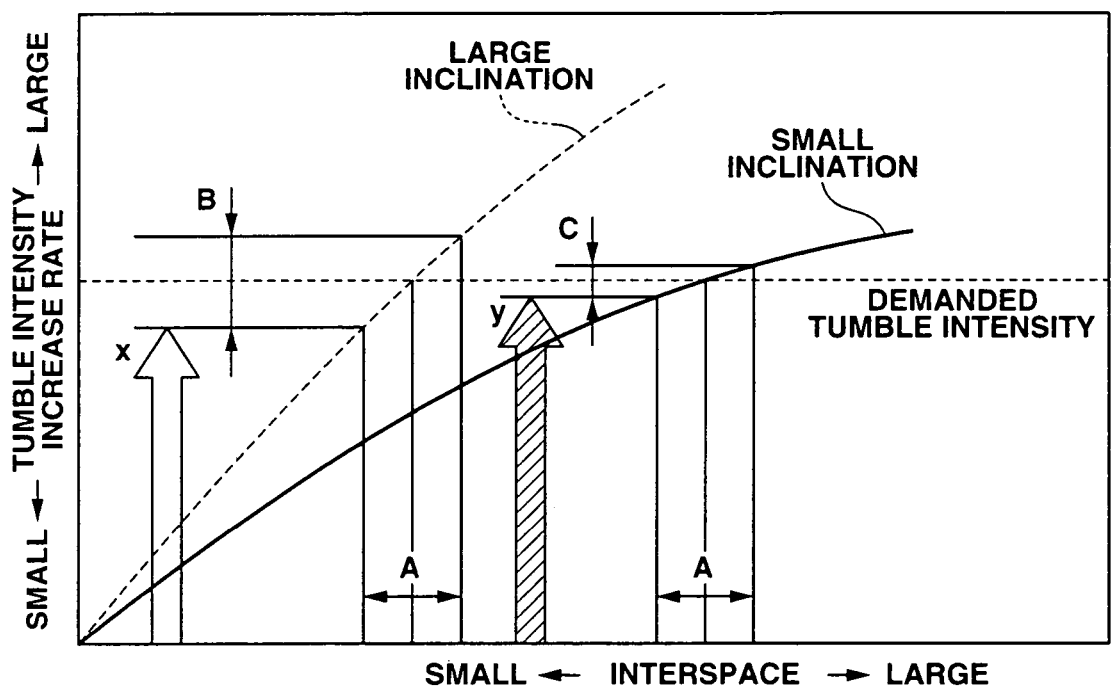
FIG. 7 is a graph showing a relationship between tumble intensity and interspace between a valve element and a partition in the first embodiment in a case where an inclination of the valve element is large, and a relationship therebetween in a case where the inclination of the valve element is small.

Further, inclination α of valve element 33 is relatively small when gas motion control valve 31 is in the full-closed position. This serves for reducing fluctuation of the tumble intensity produced in engine cylinder 2 which is caused due to dimensional errors of interspace 12. FIG. 7 shows a relationship between an increase rate of the tumble intensity and size of interspace 12 between valve element 33 and partition 11 when gas motion control valve 31 is in the full-closed position, with change in inclination α of valve element 33. As illustrated in FIG. 7, in a certain range of inclination α, the tumble intensity tends to increase when interspace 12 generated in the full-closed position of gas motion control valve 31 is increased. When inclination α is relatively large, namely, near 90 degrees, the increase rate of the tumble intensity relative to increase in size of interspace 12 rises rapidly as indicated by a broken line curve. In contrast, when inclination α is below 90 degrees and relatively small, the increase rate of the tumble intensity relative to increase in size of interspace 12 rises slowly as indicated by a solid line curve. If a demanded tumble intensity is set as indicated by a broken straight line, fluctuations of the tumble intensity relative to constant error A of interspace 12 in the cases of the large inclination α and the small inclination α are in ranges B and C, respectively. As is apparent from FIG. 7, tumble intensity fluctuation range C in the case of the small inclination α is smaller than tumble intensity fluctuation range B in the case of the large inclination α. Accordingly, this embodiment using the relatively small inclination α of valve element 33 serves for suppressing fluctuation of combustion between engine cylinders of a multiple cylinder engine.

Figure 8:
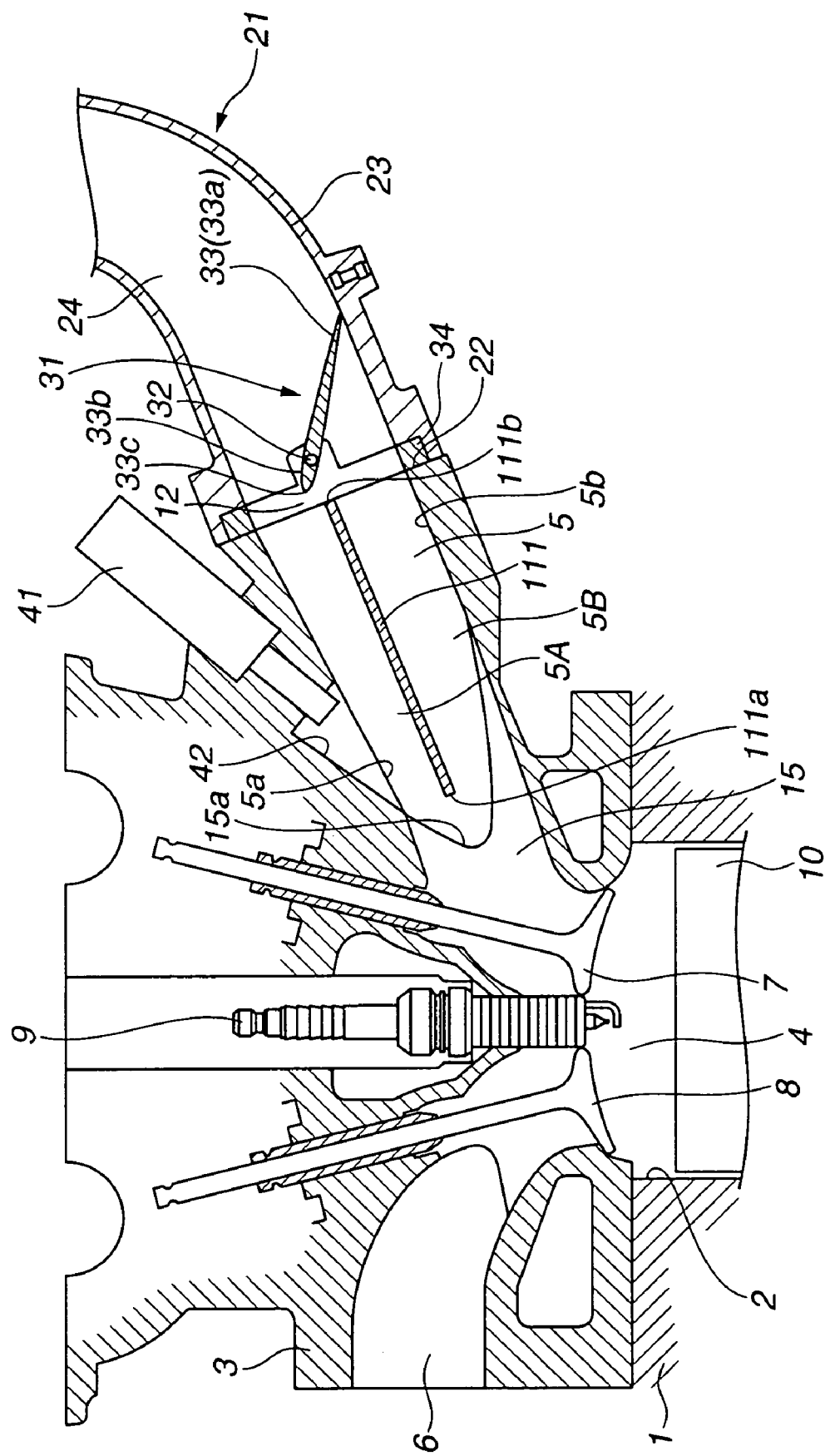
FIG. 8 is a view similar to FIG. 1, but showing an engine with an intake apparatus according to a second embodiment of the present invention.
Figure 9:
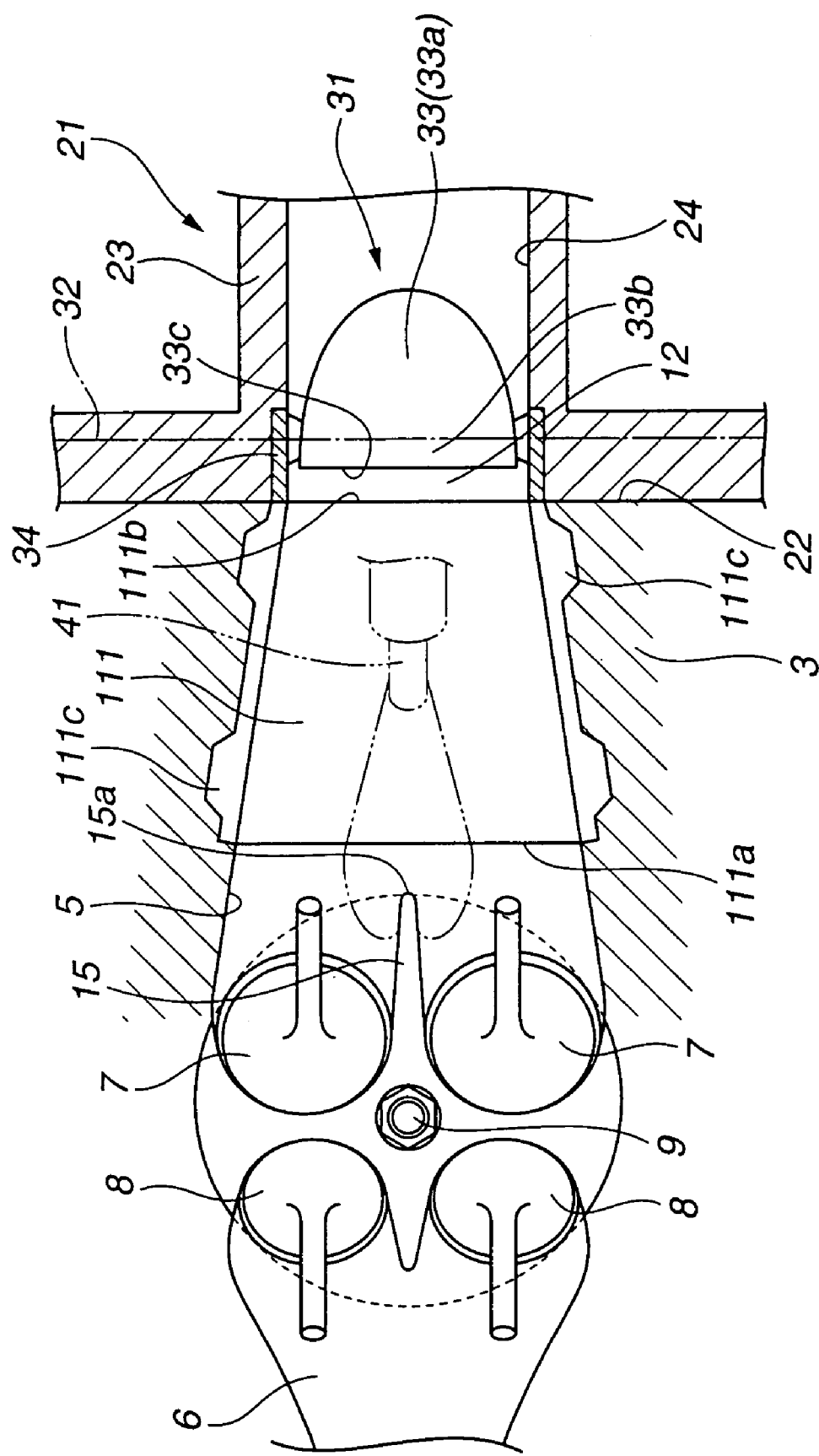
FIG. 9 is a plan view of the intake apparatus of FIG. 8 as viewed from above.

Referring to FIGS. 8 and 9, a second embodiment of the present invention is explained, which differs in arrangement of partition 111 from partition 11 of the first embodiment. Like reference numerals denote like parts, and therefore, detailed explanations therefor are omitted. As illustrated in FIGS. 8 and 9, partition 111 has upstream end 111b that extends to intake manifold mount surface 22 and is flush therewith. Specifically, intake manifold mount surface 22 and upstream end 111b of partition 111 are subjected to machining to be flush with each other, after casting cylinder head 3 with a metal plate used as partition 111. Downstream end 111a and two pairs of side projections 111c of partition 111 are the same as downstream end 11a and side projections 11c of partition 11 of the first embodiment. Gas motion control valve 31 is arranged in a slightly more upstream position within branch portion 23 than the position in the first embodiment in order to ensure interspace 12. In the second embodiment, upstream end 111b of partition 111 can be held in place with increased accuracy by the machining operation. Further, partition 111 can be elongated within a limited entire length of intake port 5.

Figure 10:
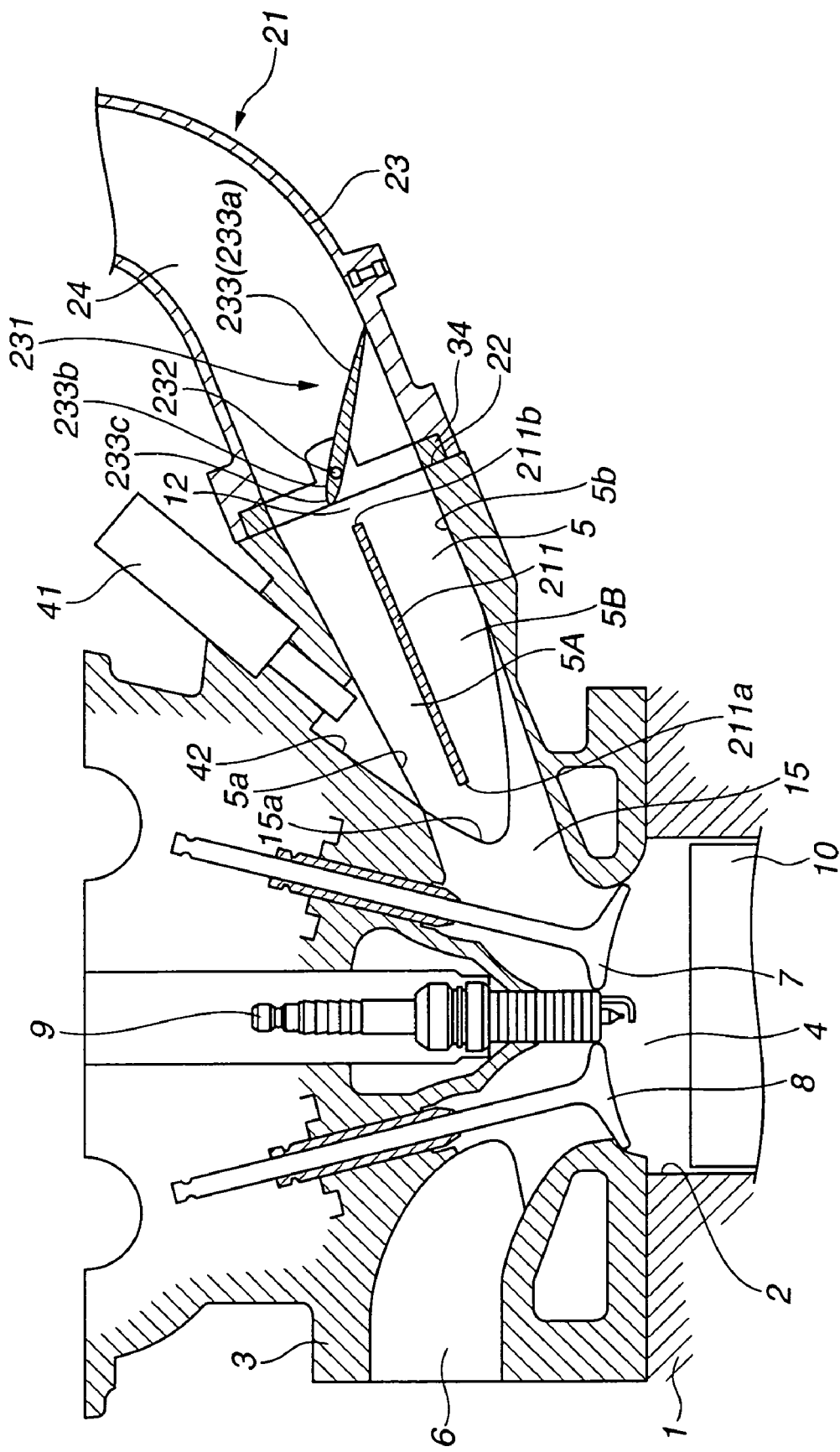
FIG. 10 is a view similar to FIG. 1, but showing an engine with an intake apparatus according to a third embodiment of the present invention.
Figure 11:
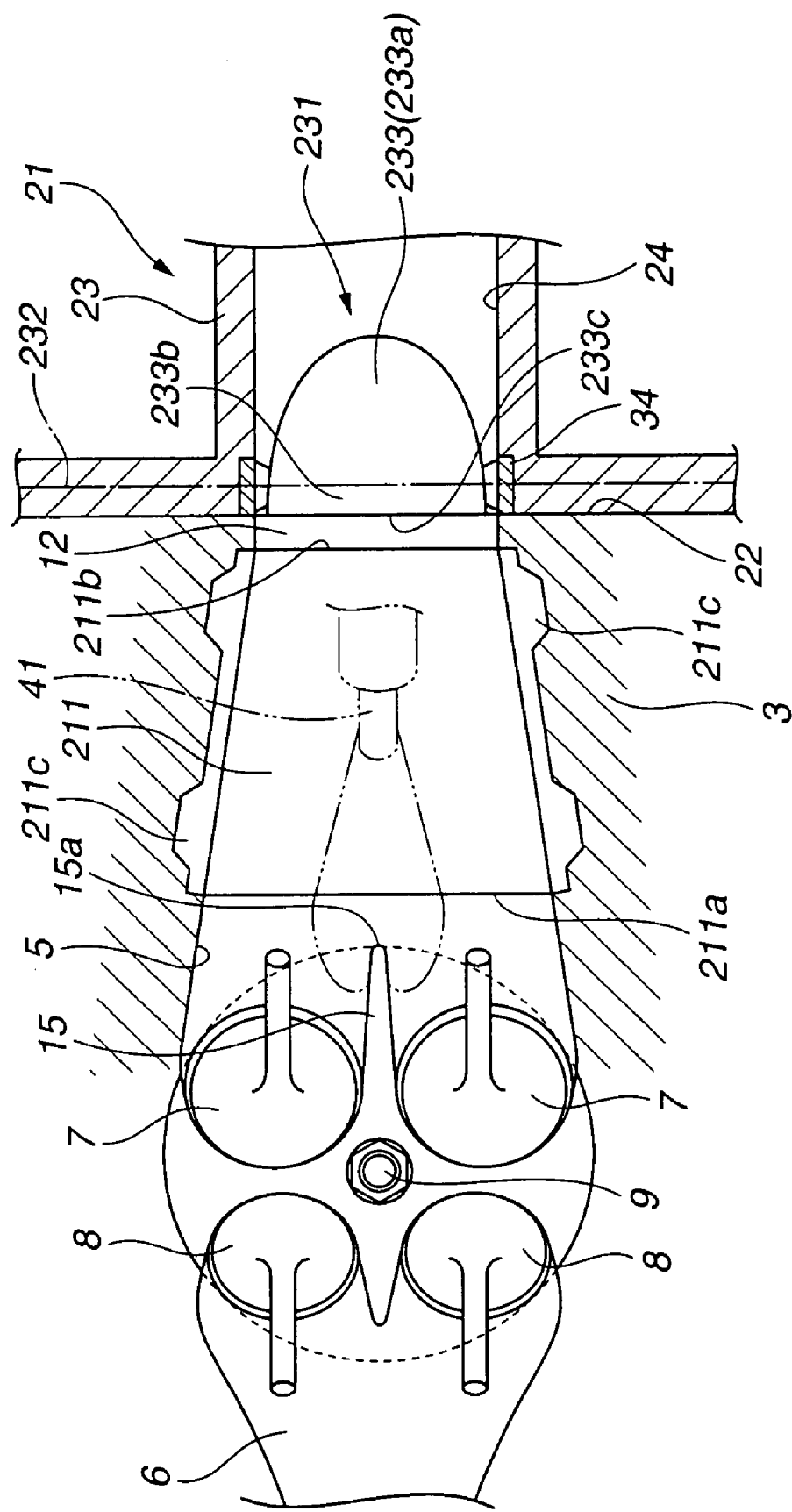
FIG. 11 is a plan view of the intake apparatus of FIG. 10 as viewed from above.

Referring to FIGS. 10 and 11, a third embodiment of the present invention is explained. In this embodiment, upstream end 211b of partition 211 is located further downstream of intake manifold mount surface 22 of cylinder head 3 as compared with upstream end 11b of partition 11 in the first embodiment. In addition, as compared with gas motion control valve 31 in the first embodiment, gas motion control valve 231 is located further downstream of the end surface of the downstream end flange of branch portion 23 when gas motion control valve 231 is in the full-closed position. In the full-closed position of gas motion control valve 231, valve element 233 is flush with the end surface of the downstream end flange of branch portion 23. With the arrangement of partition 211, similar to the first embodiment, partition 211 can be prevented from contact with tools upon machining intake manifold mount surface 22 of cylinder head 3, and the machining operation can be readily conducted. In addition, the arrangement of gas motion control valve 231 is suitable for branch portion 23 having the downstream portion that extends straight over a relatively short length. In this case, when gas motion control valve 231 is in the full-open position, the upstream end of valve element 233 is prevented from projecting into a curved portion of branch passage 24 which is positioned immediately upstream of the downstream portion of branch passage 24. The upstream end of valve element 233, therefore, can be prevented from disturbing the intake air flow passing through the curved portion of branch passage 24.

In the embodiments described above, intake port 5 is divided by partition 11, 111 and 211, into upper and lower passages, namely, first and second passages 5A and 5B, to thereby increase an incylinder tumbling fluid flow (vertical swirl). However, partition 11, 111 and 211 can be oriented in various ways to strengthen an incylinder swirling fluid flow (horizontal swirl) or to strengthen an incylinder fluid motion intermediate between the tumble and swirl.

Figure 12:
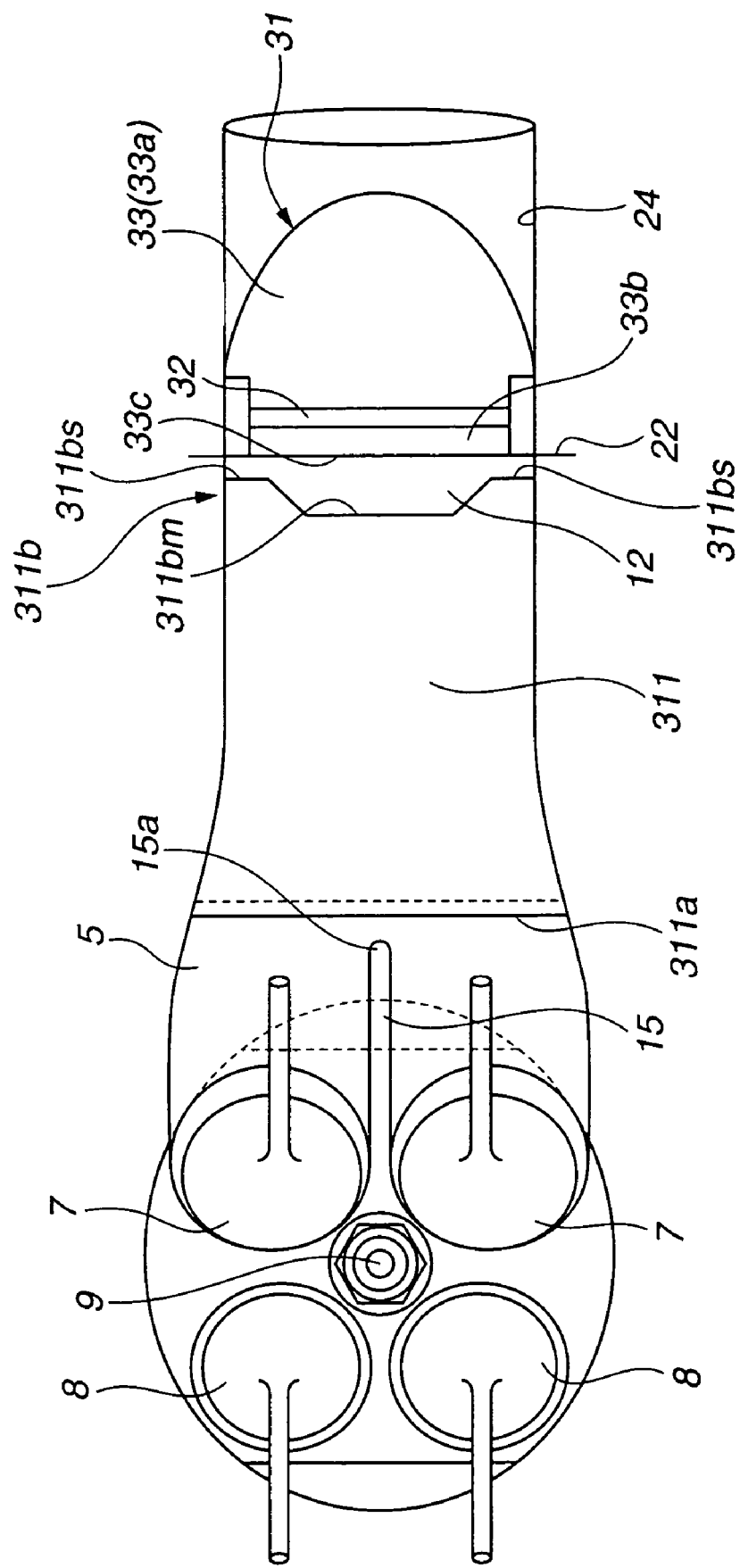
FIG. 12 is a plan view of an intake apparatus according to a fourth embodiment of the present invention, as viewed from above.

Referring to FIG. 12, a fourth embodiment of the present invention is explained. In this embodiment, upstream end 311b of partition 311 has cutout portion 311bm that is recessed toward a downstream side of partition 311 and located at a middle position in a lateral or width direction perpendicular to the longitudinal direction of partition 311. Upstream end 311b of partition 311 includes two side portions 311bs spaced from each other in the lateral direction of partition 311, between which cutout portion 311bm is located. Two side portions 311bs have lateral peripheral edges extending parallel to valve shaft 32 of gas motion control valve 31 and intake manifold mount surface 22. In this embodiment, cutout portion 311*bm* is formed into a generally trapezoidal shape in plan view as shown in FIG. 12, and is tapered toward the downstream side of partition 311. Cutout portion 311*bm* includes two sloped and straight peripheral edges connected with the lateral peripheral edges of two side portions 311*bs*, respectively. Downstream end 311*a* of partition 311 is positioned parallel to valve shaft 32 of gas motion control valve 31 and intake manifold mount surface 22. Accordingly, when gas motion control valve 31 is in the full-closed position, interspace 12 between downstream end 33*c* of valve element 33 and upstream end 311*b* of partition 311 in the longitudinal direction of partition 311 is varied along the lateral direction thereof. Namely, in the full-closed position of gas motion control valve 31, interspace 12 is smaller between downstream end 33*c* of valve element 33 and two side portions 311*bs* of upstream end 311*b* of partition 311, and is larger between downstream end 33*c* of valve element 33 and cutout portion 311*bm* of upstream end 311*b* of partition 311. Thus, interspace 12 is provided sufficiently large near at a central portion of intake port 5 and smaller near at the inside wall surface of intake port 5.

As described above, upstream end 311*b* of partition 311 is configured such that interspace 12 between upstream end 311*b* and downstream end 33*c* of valve element 33 is sufficiently large near the central portion of intake port 5 and relatively small near the inside wall surface of intake port 5. This can more effectively enhance the intake recirculation. Specifically, the production of low pressure region 13 as shown in FIG. 3 on the downstream side of gas motion control valve 31 depends on the intake flow velocity. The intake flow velocity is high near the central portion of intake port 5, and approximates to zero near the inside wall surface of intake port 5. Therefore, the pressure produced in the vicinity of the central portion of intake port 5 is sufficiently low, but the pressure produced in the vicinity of the inside wall surface of intake port 5 is not so low. If there exists large interspace 12 near the inside wall surface of intake port 5, the recirculation of intake air passing through first passage 5A to the upstream end of first passage 5A via second passage 5B and interspace 12 cannot be sufficiently attained so that a part of the intake air will inversely flow from the upstream end of first passage 5A into the upstream end of second passage 5B through large interspace 12. At this time, the part of the intake air is sucked into the upstream end of first passage 5A through large interspace 12 due to the low pressure produced near the central portion of intake port 5. This disturbs suction of the intake air at downstream end 14 shown in FIG. 3, of second passage 5B, and inhibits the intake recirculation to second passage 5B. In this embodiment, such the intake backflow from the upstream end of first passage 5A to the upstream end of second passage 5B can be suppressed by relatively reducing interspace 12 in the vicinity of the inside wall surface of intake port 5. In addition, the intake recirculation can be further enhanced using the high intake flow velocity in the vicinity of the central portion of intake port 5 effectively.

Figure 13:
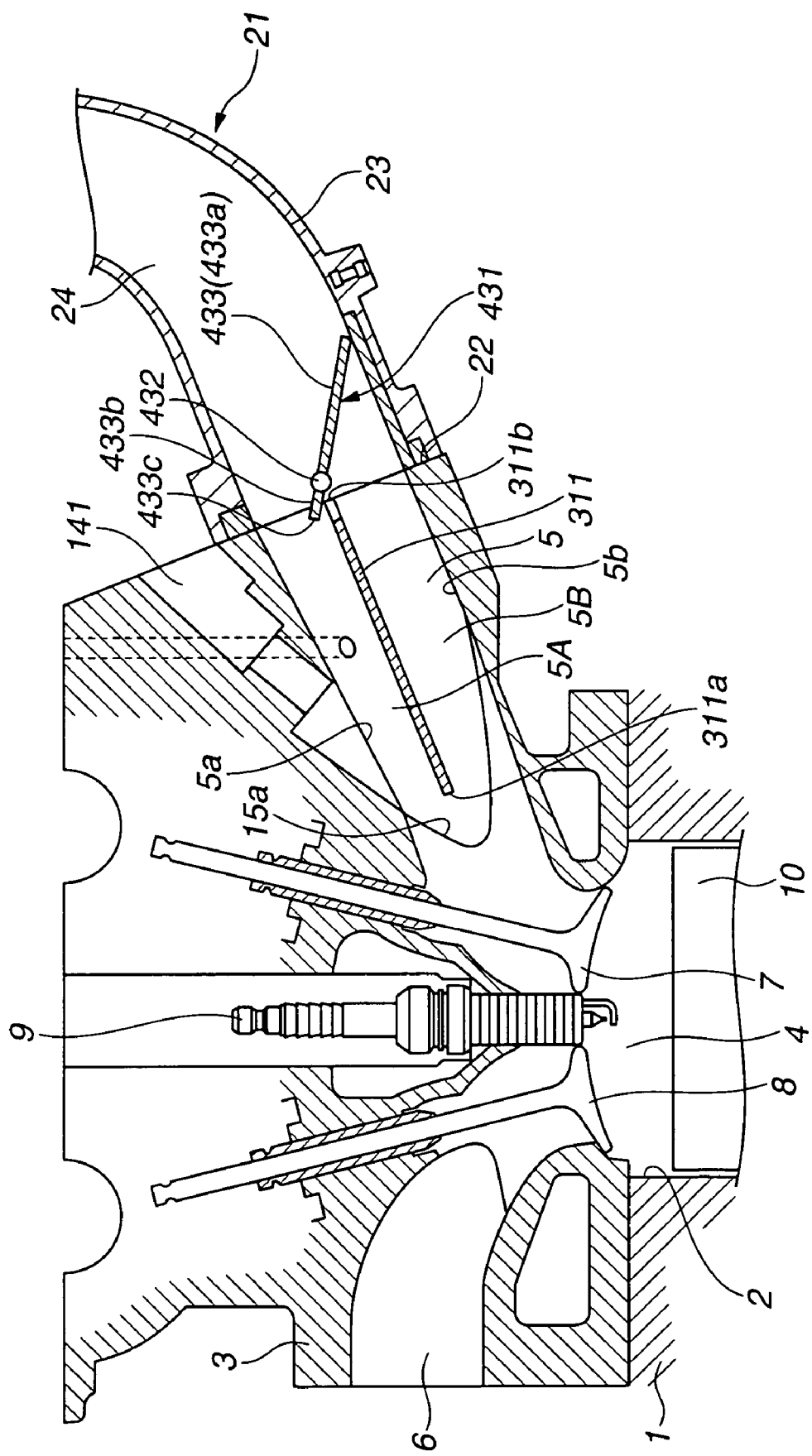
FIG. 13 is a view similar to FIG. 1, but showing an engine with an intake apparatus according to a fifth embodiment of the present invention.
Figure 14:
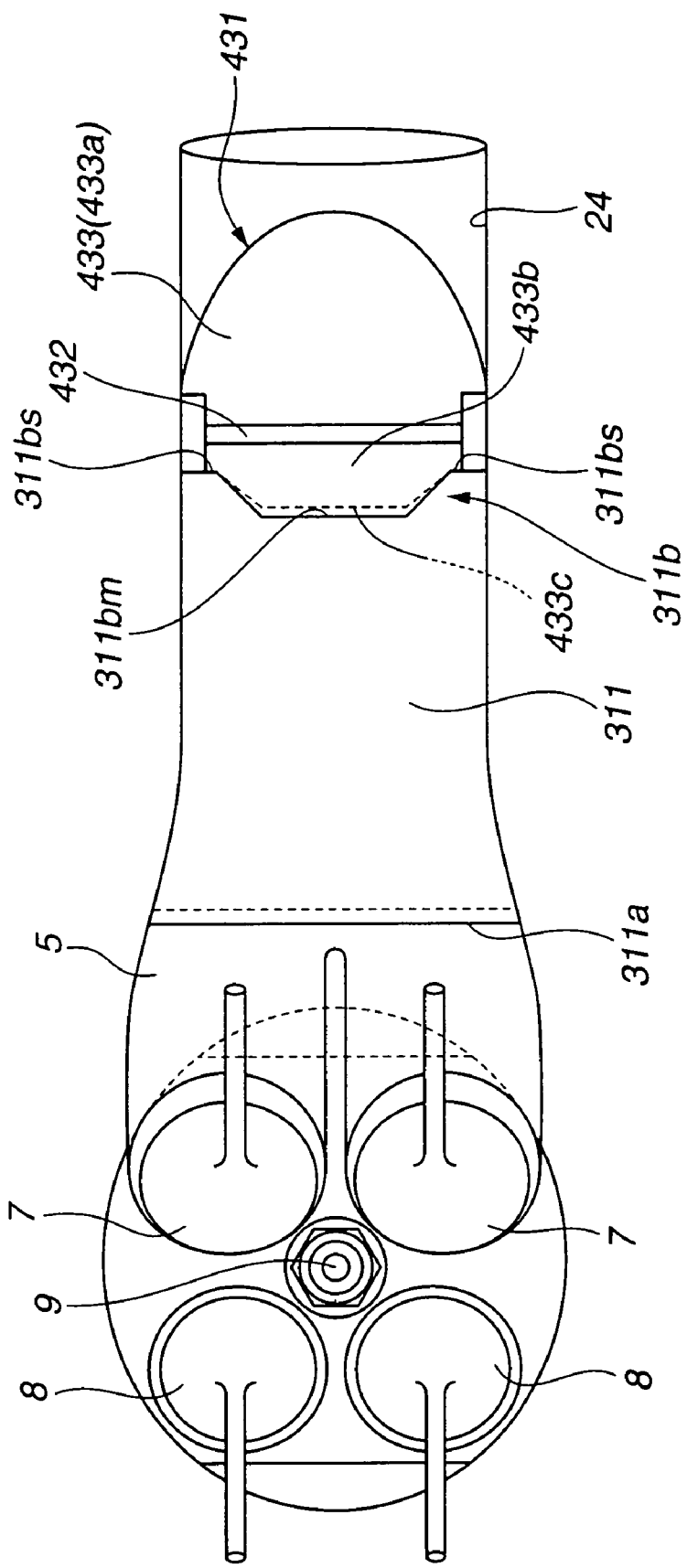
FIG. 14 is a plan view of the intake apparatus of FIG. 13 as viewed from above.

Referring to FIGS. 13 and 14, a fifth embodiment of the present invention is explained, which differs in configuration of the valve element of the gas motion control valve from the fourth embodiment. Cutout portion 311*bm* of upstream end 311*b* of partition 311 has the generally trapezoidal shape in plan view, similar to the fourth embodiment. Valve element 433 has downstream end 433*c* on extension portion 433*b* which is shaped to be substantially complementary to upstream end 311*b* of partition 311 when gas motion control valve 31 is in the full-open position. Specifically, downstream end 433*c* of valve element 433 has a generally trapezoidal-shaped projection in plan view as shown in FIG. 14, which projects toward the downstream side. The generally trapezoidal-shaped projection is arranged to match with generally trapezoidal-shaped cutout portion 311*bm* of upstream end 311*b* of partition 311.

When gas motion control valve 31 is in the full-open position where valve element 433 is aligned in plane with partition 311, downstream end 433*c* of valve element 433 is matched with upstream end 311*b* of partition 311. In this state, valve element 433 and partition 311 are substantially continuously connected with each other, so that disturbance in the intake air streams can be restrained. Meanwhile, downstream end 433*c* of valve element 433 may be configured to generate a suitable clearance between downstream end 433*c* and upstream end 311*b* of partition 311 when gas motion control valve 31 is in the full-open position.

Figure 15:
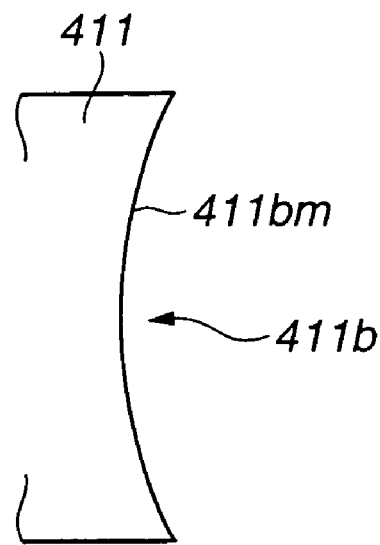
FIG. 15 is a plan view of an essential part of a partition of an intake apparatus according to a sixth embodiment of the present invention.
Figure 16:
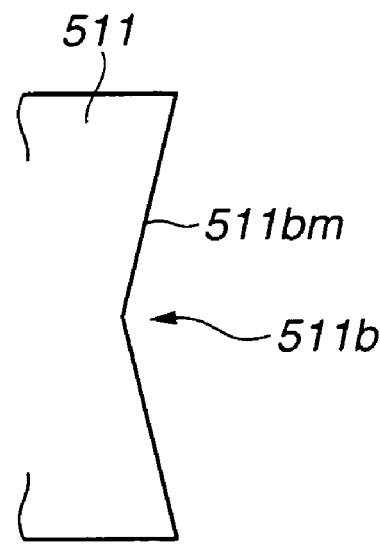
FIG. 16 is a view similar to FIG. 15, but showing a seventh embodiment of the present invention.

FIGS. 15 and 16 illustrate sixth and seventh embodiments of the present invention, respectively, which differ in configuration of the upstream end of the partition from the first through fifth embodiments. As illustrated in FIG. 15, upstream end 411*b* of partition 411 has generally arcuate-shaped cutout portion 411*bm* in plan view. Generally arcuate-shaped arcuate cutout portion 411*bm* is tapered toward the downstream side of partition 411. As illustrated in FIG. 16, upstream end 511*b* of partition 511 has generally V-shaped cutout portion 511*bm* in plan view. Generally V-shaped cutout portion 511*bm* is tapered toward the downstream side of partition 511. Similar to in the fourth embodiment, in the sixth and seventh embodiments, downstream end 33*c* of valve element 33 can be formed with a straight lateral peripheral edge parallel to valve shaft 32 and intake manifold mount surface 22. Otherwise, in the sixth and seventh embodiments, downstream end 33*c* of valve element 33 can be shaped to be substantially complementary to cutout portion 411*bm* of upstream end 411*b* of partition 411 and cutout portion 511*bm* of upstream end 511*b* of partition 511, respectively.

Figure 17:
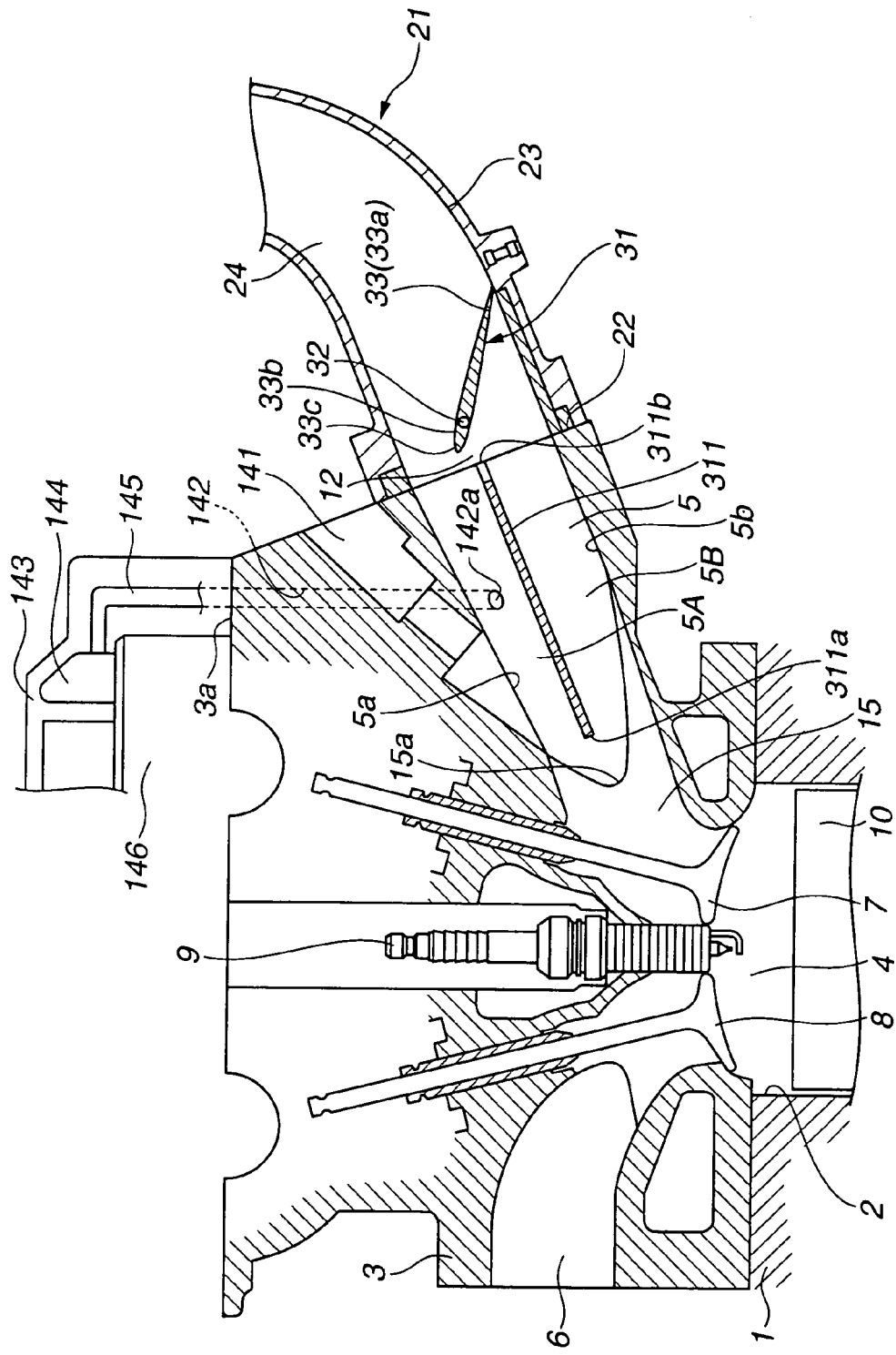
FIG. 17 is a view similar to FIG. 1, but showing an engine with an intake apparatus according to an eighth embodiment of the present invention.

Referring to FIG. 17, an eighth embodiment of the present invention is explained. This embodiment differs in provision of blowby gas passage 142 from the first embodiment. As illustrated in FIG. 17, blowby gas passage 142 extends through cylinder head 3 into intake port 5. Blowby gas passage 142 has one end 142*a* that is open into first passage 5A of intake port 5 and located on the downstream side of gas motion control valve 31. Specifically, blowby gas passage 142 extends aside a fuel injector mounted to fuel injector mount portion 141. Fuel injector mount portion 141 is formed in cylinder head 3 and located upward of intake port 5. The fuel injector is designed to provide a generally V-shaped split spray of fuel corresponding to the pair of intake valves 7. Fuel injector mount portion 141 is positioned near intake valve 7 in order to prevent the fuel spray oriented toward valve heads of intake valves 7 from interfering with partition 311.

One end 142*a* of blowby gas passage 142 is located in inside upper wall surface 5*a* defining first passage 5A of intake port 5, and is offset from a plane that extends in the up-and-down direction of engine cylinder 2 and contains a central axis of intake port 5 which extends in the longitudinal direction thereof. Namely, one end 142*a* of blowby gas passage 142 is located in an offset position offset from the central axis of intake port 5 in the direction of the engine cylinder row. One end 142*a* of blowby gas passage 142 is thus communicated with first passage 5A through which the intake air always flows regardless of the operating position of gas motion control valve 31, and acts as a blowby gas inlet for introducing blowby gas into first passage 5A. One end 142a of blowby gas passage 142 is positioned at substantially a middle of a length of first passage 5A.

Blowby gas passage 142 extends straight from flange surface 3a of cylinder head 3 to intake port 5 in parallel relation to the axial direction of engine cylinder 2. Blowby gas passage 142 is formed by a suitably machining, for instance, drilling. An opposite end of blowby gas passage 142 is open in flange surface 3a of cylinder head 3, and connected with blowby gas main passage 144 of cylinder head cover 143 via communication passage 145. Blowby gas main passage 144 is formed in an upper portion of cylinder head cover 143, and communication passage 145 is formed in a side wall of cylinder head cover 143. Blowby gas main passage 144 is communicated with valve train chamber 146 inside cylinder head cover 143 via a flow control valve, namely, a so-called PCV valve. Blowby gas in a crankcase flows into valve train chamber 146 and then into intake port 5 via blowby gas main passage 144, communication passage 145 and blowby gas passage 142. The blowby gas is thus introduced into first passage 5A of intake port 5 through which the intake air always flows regardless of the operating positions of gas motion control valve 31. The blowby gas is then supplied to combustion chamber 4 via first passage 5A.

Generally known, the blowby gas delivered from the crankcase contains oil component unremoved by an oil separator, water and carbon and the like. If the blowby gas is delivered from an upstream side of gas motion control valve 31, gas motion control valve 31 will be contaminated by the oil component in the blowby gas so that valve element 33 will stick fast. Further, if the blowby gas is delivered from a downstream side of gas motion control valve 31 into second passage 5B, gas motion control valve 31 will be contaminated by the oil component in the blowby gas, resulting from the intake air recirculation occurring in the full-closed position of gas motion control valve 31.

In this embodiment, one end 142a of blowby gas passage 142, namely, the blowby gas inlet, is open in inside upper wall surface 5a defining first passage 5A and is positioned downstream of gas motion control valve 31. With the arrangement of the blowby gas inlet, gas motion control valve 31 can be prevented from being exposed to the blowby gas passing through blowby gas passage 142, and therefore valve element 33 can be prevented from sticking fast. If one end 142a of blowby gas passage 142 is open in inside upper wall surface 5a and positioned near at upstream end 311b of partition 311, the oil component in the blowby gas will adhere to gas motion control valve 31 due to a pulsating flow of intake air. In contrast, if one end 142a of blowby gas passage 142 is open in inside upper wall surface 5a and positioned near at downstream end 311a of partition 311, the blowby gas will be introduced into second passage 5B and then flow back to the upstream side of intake port 5 due to the intake air recirculation caused when gas motion control valve 31 is in the full-closed position. Accordingly, it is preferred to position one end 142a of blowby gas passage 142 at substantially a middle of the length of first passage 5A.

Further, blowby gas passage 142 extends parallel to the axial direction of engine cylinder 2, whereby an acute angle is made between blowby gas passage 142 and intake port 5 inclined relative to the axial direction of engine cylinder 2. This promotes delivery of the blowby gas merged with the intake air in first passage 5A, to combustion chamber 4.

Blowby gas main passage 144 can be provided outside cylinder head cover 143 using a separate pipe member. In such a case, the separate pipe member is connected with blowby gas passage 142 via external piping.

This application is based on prior Japanese Patent Application No. 2003-100196 filed on Apr. 3, 2003, Japanese Patent Application No. 2003-100199 filed on Apr. 3, 2003, and Japanese Patent Application No. 2003-100200 filed on Apr. 3, 2003. The entire contents of the Japanese Patent Applications No. 2003-100196, No. 2003-100199 and No. 2003-100200 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An intake apparatus for an internal combustion engine, the internal combustion engine including a cylinder head that defines a plurality of engine cylinders and an intake port connected to each of the engine cylinders, and an intake manifold connected with the intake port, the intake apparatus comprising:
   a partition disposed within the intake port defined by the cylinder head, the partition extending in a longitudinal direction of the intake port so as to divide an inside region of the intake port into a first passage and a second passage; and
   a gas motion control valve disposed at a downstream end of the intake manifold and adjacent to an upstream end of the partition, the gas motion control valve including a rotatable valve element and having a full-closed position where the valve element fully closes the second passage of the intake port and a full-open position where the valve element fully opens the second passage of the intake port, the valve element and the partition cooperating with each other to define an interspace between the valve element and the upstream end of the partition when the gas motion control valve is in the full-closed position.

2. The intake apparatus as claimed in claim 1, wherein the gas motion control valve comprises a rotatable valve shaft on which the valve element is supported, the valve shaft being located on a plane extending from the partition, the valve element being aligned in plane with the partition when the gas motion control valve is in the full-open position.

3. The intake apparatus as claimed in claim 1, wherein the valve element partially projects toward the first passage of the intake port when the gas motion control valve is in the full-closed position.

4. The intake apparatus as claimed in claim 2, wherein the valve element comprises a main portion extending in one direction from the valve shaft so as to fully close the second passage when the gas motion control valve is in the full-closed position, and an extension portion extending in an opposite direction from the valve shaft, the extension portion projecting toward the first passage when the gas motion control valve is in the full-closed position, the extension portion being positioned so as to minimize the interspace when the gas motion control valve is in the full-open position.

5. The intake apparatus as claimed in claim 1, wherein the partition is in the form of a plate as an insert inserted into the cylinder head upon casting the cylinder head.

6. The intake apparatus as claimed in claim 1, wherein the upstream end of the partition extends straight along an intake manifold mount surface of the cylinder head onto which the intake manifold is mounted, the upstream end of the partition being flush with the intake manifold mount surface.

7. The intake apparatus as claimed in claim 1, wherein the upstream end of the partition is located downstream of an intake manifold mount surface of the cylinder head onto which the intake manifold is mounted.

8. The intake apparatus as claimed in claim 1, wherein the second passage of the intake port is a lower region of the intake port that is located below the partition in an up-and-down direction of the engine cylinder, the first passage of the intake port being an upper region of the intake port that is located above the partition in the up-and-down direction of the engine cylinder.

9. The intake apparatus as claimed in claim 1, wherein the valve element is inclined to guide an intake air flow to the first passage of the intake port when the gas motion control valve is in the full-closed position.

10. The intake apparatus as claimed in claim 1, wherein the upstream end of the partition comprises a cutout portion recessed toward a downstream side of the partition, the cutout portion being located at substantially a middle position in a lateral direction of the partition.

11. The intake apparatus as claimed in claim 10, wherein the cutout portion of the upstream end of the partition is tapered toward the downstream side of the partition.

12. The intake apparatus as claimed in claim 10, wherein the gas motion control valve comprises a rotatable valve shaft on which the valve element is supported, the upstream end of the partition including two side portions spaced from each other in the lateral direction of the partition, between which the cutout portion is located, the two side portions having lateral peripheral edges extending parallel to the valve shaft, respectively.

13. The intake apparatus as claimed in claim 10, wherein the valve element comprises a downstream end shaped to be substantially complementary to the cutout portion of the upstream end of the partition when the gas motion control valve is in the full-open position.

14. The intake apparatus as claimed in claim 12, wherein when the gas motion control valve is in the full-closed position, the interspace is larger between the cutout portion of the upstream end of the partition and the valve element and smaller between the two side portions of the upstream end of the partition and the valve element.

15. The intake apparatus as claimed in claim 10, further comprising a blowby gas passage extending through the cylinder head into the intake port, the blowby gas passage having one end that is open into the first passage of the intake port and located on a downstream side of the gas motion control valve.

16. The intake apparatus as claimed in claim 15, wherein the second passage of the intake port is a lower region of the intake port that is located below the partition in an up-and-down direction of the engine cylinder, the first passage of the intake port being an upper region of the intake port that is located above the partition in the up-and-down direction of the engine cylinder, the internal combustion engine further comprising a fuel injector mounted into the cylinder head above the intake port, the blowby gas passage extending aside the fuel injector, the one end of the blowby gas passage being located in an upper wall surface defining the first passage of the intake port and offset from a plane that extends in the up-and-down direction of the engine cylinder and contains a central axis of the intake port which extends in the longitudinal direction thereof.

17. The intake apparatus as claimed in claim 15, wherein the one end of the blowby gas passage is positioned at substantially a middle of a length of the first passage of the intake port.

18. An intake apparatus for an internal combustion engine, the internal combustion engine including a plurality of engine cylinders, an intake port connected to each of the engine cylinders, and an intake manifold connected with the intake port, the intake apparatus comprising:
   an engine block including a cylinder head that defines the intake port;
   split means for dividing an inside region of the intake port into a first passage and a second passage which extend in a longitudinal direction of the intake port, the split means being disposed within the intake port defined by the cylinder head; and
   valve means for controlling intake air flowing into the second passage of the intake port, the valve means being disposed within the intake manifold and cooperating with the split means to recirculate a part of intake air flowing toward the engine cylinder through the first passage of the intake port, to an upstream end of the first passage of the intake port through the second passage of the intake port when the valve means prevents the intake air flowing into the second passage of the intake port.

19. The intake apparatus as claimed in claim 18, wherein the split means comprises backflow reducing means for reducing backflow of the intake air from the upstream end of the first passage of the intake port to an upstream end of the second passage of the intake port when the valve means prevents the intake air flowing into the second passage of the intake port.

20. The intake apparatus as claimed in claim 18, wherein the engine block comprises a blowby gas passage for delivering blowby gas to the first passage of the intake port, the blowby gas passage having an end located downstream of the valve means.

* * * * *